United States Patent [19]
Holzapfel et al.

[11] Patent Number: 5,519,492
[45] Date of Patent: May 21, 1996

[54] OPTICAL ARRANGEMENT FOR DETECTING THE INTENSITY MODULATION OF PARTIAL RAY BEAMS

[75] Inventors: Wolfgang Holzapfel, Obing; Walter Huber, Traunstein, both of Germany

[73] Assignee: Dr. Johannes Heidenhain GmbH, Traunreut, Germany

[21] Appl. No.: 83,138

[22] Filed: Jun. 25, 1993

[30] Foreign Application Priority Data

Jun. 27, 1992 [DE] Germany ............................ 42 21 165.4
Jul. 21, 1992 [EP] European Pat. Off. .............. 92112487

[51] Int. Cl.$^6$ ................................................. G01B 11/02
[52] U.S. Cl. ....................... 356/356; 356/363; 250/237 G
[58] Field of Search ................................. 356/356, 363, 356/446, 371, 343, 336, 374, 375; 250/237 G

[56] References Cited

U.S. PATENT DOCUMENTS

| | | | |
|---|---|---|---|
| 4,222,633 | 9/1980 | Hock | 356/395 |
| 4,677,293 | 6/1987 | Michel | 250/237 G |
| 4,837,588 | 6/1989 | Imakawa et al. | 250/237 G |
| 5,061,073 | 10/1991 | Michel | 356/374 |
| 5,120,132 | 6/1992 | Spies et al. | 356/356 |
| 5,196,711 | 3/1993 | Matsugu et al. | 250/548 |
| 5,214,280 | 5/1993 | Rieder et al. | 250/237 G |
| 5,264,915 | 11/1993 | Huber et al. | 356/401 |
| 5,283,434 | 2/1994 | Ishizuka et al. | 250/237 G |

FOREIGN PATENT DOCUMENTS

| | | | |
|---|---|---|---|
| 0163362 | 6/1988 | European Pat. Off. | 356/363 |
| 2451668 | 5/1976 | Germany | 356/363 |
| 3834676 | 4/1990 | Germany | 356/363 |

OTHER PUBLICATIONS

"Optics Guide 3" published by Melles Griot, (1985), pp. 16–20.

*Primary Examiner*—Rolf Hille
*Assistant Examiner*—Minhloan Tran
*Attorney, Agent, or Firm*—Willian Brinks Hofer Gilson & Lione

[57] ABSTRACT

An optical arrangement or length- or angle-measuring device comprising an illumination device for generating partial ray beams and an image lens to receive and transmit the partial ray beams, wherein each of the received partial ray beams defines an angle of inclination with respect to the image lens. The optical arrangement further comprises a plurality of detectors to receive the transmitted partial ray beams and the detectors are positioned so that the distance between the image lens and the individual photodetectors is a function of the angle of inclination of the partial ray beams received by the image lens.

39 Claims, 3 Drawing Sheets

OPTICAL ARRANGEMENT FOR DETECTING THE INTENSITY MODULATION OF PARTIAL RAY BEAMS

Applicants claim, under 35 U.S.C. § 119, the benefit of priority of the filing date of Jun. 27, 1992, of a German application, copy attached, Serial Number P 42 21 165.4, filed on the aforementioned date, the entire contents of which are incorporated herein by reference. Applicants further claim, under 35 U.S.C. § 119, the benefit of priority of the filing date of Jul. 21, 1992, of a European application, copy attached, Serial Number 92112487.1, filed on the aforementioned date, the entire contents of which are incorporated herein by reference.

FIELD OF THE INVENTION

The invention relates to an optical arrangement for detecting the intensity modulation of partial ray beams inclined in various directions, particularly an interferentially-operating position-measuring device having an illumination device and a plurality of grids that are displaceable relative to each other.

DESCRIPTION OF PRIOR ART

European Patent Document EP 0 163 362 B1 discloses a measuring device wherein the photodetectors are disposed in the focal plane of the lens. The arrangement of the photodetectors in one plane has the disadvantage, however, that photodetectors with a relatively large surface area are required in order to concentrate the total intensity of the individual ray beams onto the photodetectors.

SUMMARY OF THE INVENTION

Accordingly, it is an object of the invention to create an optical arrangement, particularly a length- or angle-measuring device, with which the ray beams detected by an image lens can be detected completely with photodetectors that have a small surface area and are subsequently faster.

This object is attained by means of an optical arrangement or length- or angle-measuring device comprising an illumination device for generating partial ray beams and an image lens to receive and transmit the partial ray beams, wherein each of the received partial ray beams defines an angle of inclination with respect to the image lens. The optical arrangement further comprises a plurality of detectors to receive the transmitted partial ray beams and the detectors are positioned so that the distance between the image lens and the individual photodetectors is a function of the angle of inclination of the partial ray beams received by the image lens.

The particular advantages of the invention are that photodetectors can be used that have a small surface area, and are therefore faster.

Moreover, the entire ray beams are detected by the photodetectors, guaranteeing a high intensity of the signals derived from the photodetectors. It is assured by means of the invention that the peripheral rays of the ray beams also impact completely on the photodetectors, and that the scanning area of the graduated grid is also completely and uniformly imaged onto the photodetectors.

Further advantageous features of the invention will become apparent from the detailed description of exemplary embodiments of the invention, taken in conjunction with the drawings.

DESCRIPTION OF THE PREFERRED EMBODIMENTS

Figure 1:
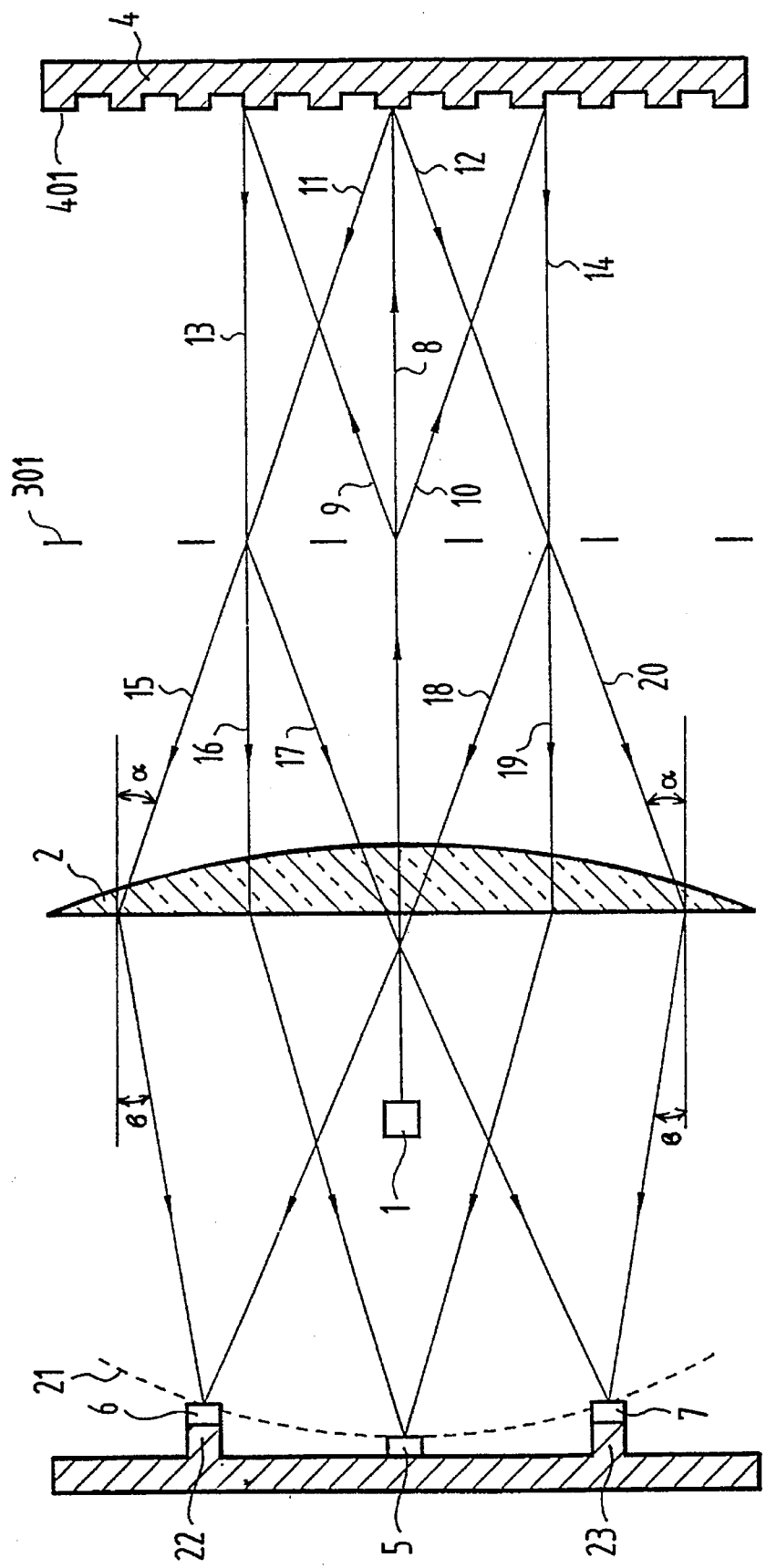
FIG. 1 shows a schematic representation of the design and ray path of a length-measuring device in accordance with an embodiment of the present invention.

The photoelectric length-measuring device shown in FIG. 1 includes a light source 1, a lens 2, a scanning plate 3 with a grid 301, a reflecting graduated grid 401, and three photodetectors 5, 6 and 7. As explained in detail in EP 0 163 362 B1, the light generated by the light source 1 and collimated by the lens 2 is diffracted in three different directions as it passes through the grid 301. These first diffracted, partial ray beams comprise 0th, +1st and −1st diffraction order and are identified as reference numerals 8, 9 and 10, respectively, in FIG. 1.

The first partial ray beams 8, 9 and 10 are reflected on the graduated grid 401, and deflected one more time into +1st and −1st components so as to produce second diffracted partial ray beams 11, 12, 13 and 14. These partial ray beams 11, 12, 13 and 14 pass again through the grid 301, and are again diffracted and come to interference. The third diffracted partial ray beams 15 through 20 are received by and transmitted through lens 2. Thus, source 1, lens 2, grid 301, and graduated grid 401 act as an illumination device for generating diffracted partial ray beams to impact on lens 2. Those third diffracted partial ray beams having the same angle of inclination with respect to lens 2, are collected by the lens 2 and directed at the three photodetectors 5, 6 and 7, which convert the intensity modulations into three electrical signals phase-shifted by 120° from each other. These electrical signals form a value for the direction and size of the displacement of the grid 301, in relation to the graduated grid 401.

The angle of inclination of the partial ray beams 15, 18 and 17, 20 impacting on the lens 2 depends on the separation period of grids 301 and 401. The smaller the graduation period at a given wavelength $\lambda$, the larger the angle of inclination of the third diffracted partial ray beams 15, 18 and 17, 20 ($\lambda$=constant in this case). For example, ray beam 20 enters lens 2 at an angle of inclination $\alpha$, relative to a line parallel to the optical axis of lens 2. The ray beam is bent by lens 2 so that it exits lens 2 at an angle of inclination $\alpha$, as shown in FIG. 1.

The lens 2 does not image the partial ray beams 15 through 20, which have varying inclinations, onto a common plane. The larger the angle of inclination of the partial ray beams 15 through 20 impacting on the lens 2, the closer the point of optimum imaging—that is, the image point of a light source point—is to the lens 2. This is taken into account by the present invention in that the photodetectors 6, 7 of the more steeply inclined partial ray beams 15, 18 and 17, 20 are disposed closer to the lens 2 than the photodetector 5 of the partial ray beams 16, 19, which are not inclined with respect to lens 2. The distance between the lens 2 and the individual photodetectors 5, 6, 7 is therefore selected as a function of the angle of inclination of the partial ray beams 15 through 20 with respect to the lens 2.

FIG. 1 includes a schematic drawing of the image shell 21, which is generated by the convexity of the image and on which the points of optimum imaging of the variously inclined partial ray beams 15 through 20 collected by the lens 2 lie. When the photodetectors 5, 6, 7 are disposed on this image shell 21, photodetectors 5, 6, 7 having small surface areas can be used, and the entire partial ray beams 15 through 20 can be detected despite this. Particularly with high-resolution measuring devices with grids 301, 401 with short graduation periods and, thus, large angles of inclination of the partial ray beams with respect to the optical axis of the lens, this has the great advantage that very fast photodetectors 5, 6, 7 can be used. It is known that the rapidity, i.e., the frequency response of photodetectors 5, 6, 7, is a function of the size of the receiving surface. The smaller the receiving surface, the faster and better the photodetectors 5, 6, 7 can detect the intensity modulation of the partial ray beams 15, 18 and 17, 20.

The photodetectors 5, 6, 7 can be secured in a known way on a plate. To attain the varying distances between the lens 2 and the photodetectors 5, 6, 7, the photodetectors 5, 6, 7 can be secured to raised parts 22, 23.

A multilayer plate technique can also be implemented in a way that is not shown, in that the photodetector 5 is disposed on a first plate, and the photodetectors 6, 7 are disposed on a second plate, placed above the first. Flexible plates that are arched in a suitable way can likewise be used.

Figure 2:
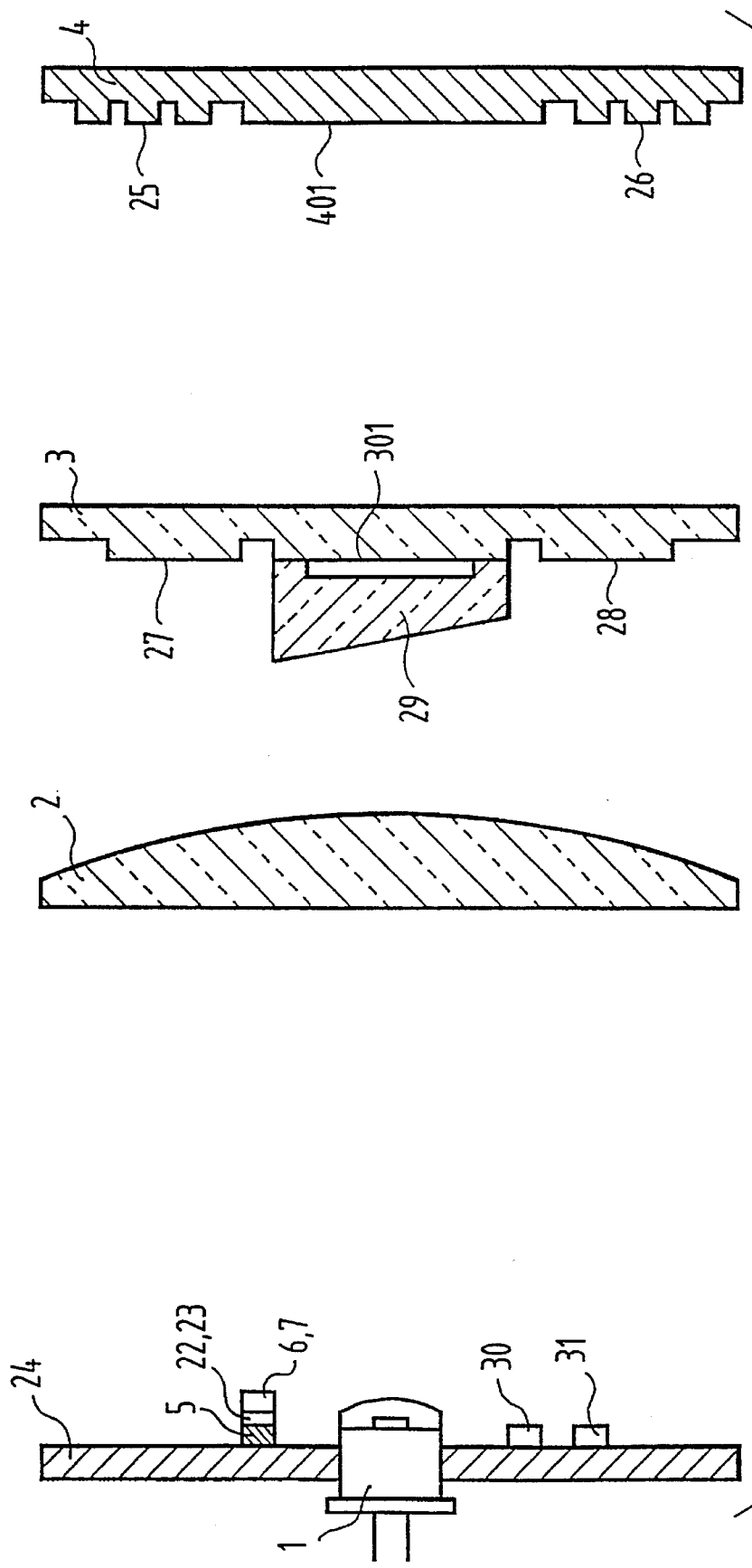
FIG. 2 show a further exemplary embodiment of the present invention of a length-measuring device with a reference mark.

A further exemplary embodiment of a length-measuring device is shown in FIG. 2 in which reference marks 25, 26 are disposed next to the graduated grid 401. The principal design and mode of operation of this length-measuring device with reference marks are known per se from German Patent Publication DE 38 34 676 A1. The same reference numerals are used for the same components in FIGS. 1 and 2. Only the differences with respect to the prior art and the measuring device described in FIG. 1 are described below.

The light source 1 and the photodetectors 5, 6, 7 are disposed on a plate 24. The photodetectors 5, 6, 7 are closer to the lens 2 than the photodetector 5. Aside from the graduated grid 401, reference marks 25, 26 are located on the scale 4. Besides the grid 301, the scanning plate 3 has reference marks-scanning fields 27, 28 for scanning the scale graduation 401. A prism 29 deflecting crosswise with respect to the measuring direction is disposed above the grid 301, by means of which an optical graduation of the scanning ray paths is achieved during scanning of the graduated grid 401 and the two reference marks 25, 26. To generate a reference signal, at least one further photodetector 30, 31 is associated with the reference marks 25, 26.

A number of prisms that direct the ray beams at a plurality of photodetectors can also be used for optical graduation of the scanning ray paths. In this case it is also advantageous when the prisms are disposed between the photodetectors and the scanning plate. For better handling and adjustment of the prisms, it is advantageous to mount them on a plate or, when a plurality of prisms are used, to integrate them into a common prism plate.

Up to this point a length-measuring device with a reflective scale 4 has been described. The invention is not limited to this, however; it can also be used in angle-measuring devices with a reflective index disk as a scale and, in length- or angle-measuring devices with a transparent scale, i.e., in transillumination systems. The number of grids passed through is also not limited to three. An arrangement of two grids is particularly advantageous in transillumination devices.

Figure 3:
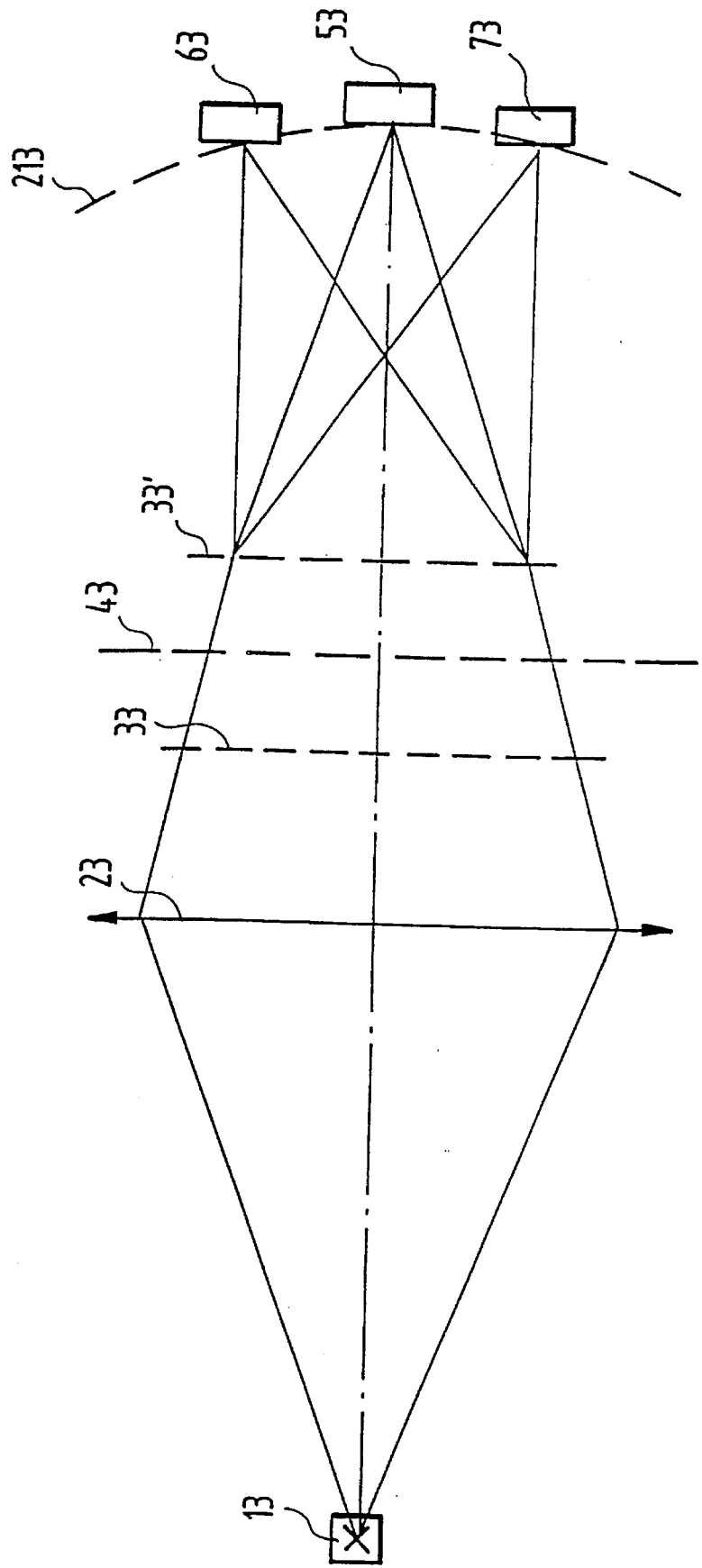
FIG. 3 shows a schematic representation of a length-measuring device in accordance with an embodiment of the present invention practicing the transillumination principle.

FIG. 3 shows a schematic of a three-grid transmitter in accordance with the transillumination method. Light is transmitted by an illumination device 13 towards a lens 23. Lens 23 generates light which is uncollimated and directed convergently at a first diffraction grid 33. At grid 33 the light is diffracted and transmitted to penetrates a graduated grid 43. Grid 43 diffracts and transmits the light to a third grid 33'. Grid 33' then diffracts the light and transmits the diffracted light to photodetectors. These processes correspond in analogous fashion to those described for FIG. 1.

The distances of the photodetectors 53, 63, 73 from the image lens 23 likewise correspond to those of FIG. 1 and are a function of the inclination of the interfering ray beams.

This arrangement further has the advantage of a very simple design and high efficiency in conjunction with good signal behavior when distances are altered.

The result of the principles underlying the invention is that the spacing dependency of the photodetector on the angle of inclination of the partial ray beams does not necessarily require a position-measuring device that operates interferentially. This is only one particularly advantageous application for which the invention is well-suited.

The invention may be embodied in other forms than those specifically disclosed herein without departing from its spirit or essential characteristics. For example, the grids used can be both phase grids as well as amplitude grids. Furthermore, it is also possible, however, to generate partial ray beams inclined toward each other with other optical elements besides grids, such as prisms. The described embodiments are to be considered in all respects only as illustrative and not restrictive, and the scope of the invention is commensurate with the appended claims rather than the foregoing description.

We claim:

1. An optical arrangement for detecting the intensity modulation of partial ray beams, said optical arrangement comprising:

an illumination device for generating said partial ray beams;

one image lens having an optic axis, said one image lens receiving said partial ray beams and transmitting said received partial ray beams, wherein each of said received partial ray beams defines an angle of inclination with respect to a line parallel to said optic axis of said image lens; and a plurality of detectors receiving said transmitted partial ray beams from said image lens during a given moment of time, whereby the one image lens directs a focused ray beam at each of said detectors;

said detectors positioned so that the perpendicular distance between the individual photodetectors and a plane which is perpendicular to said optic axis varies as a function of the angle of inclination of the partial ray beams received by said image lens.

2. The optical arrangement as defined by claim 1, wherein the larger the angle of inclination, the smaller the distance between the image lens and a photodetector.

3. The optical arrangement as defined by claim 2, comprising a diffraction grid positioned between said image lens and said plurality of photodetectors to receive said transmitted partial ray beams and produce diffracted partial ray beams which produce a diffraction image on said detectors.

4. The optical arrangement as defined by claim 1, comprising a diffraction grid positioned between said image lens and said plurality of photodetectors to receive said transmitted partial ray beams and produce diffracted partial ray beams which produce a diffraction image on said detectors.

5. The optical arrangement as defined by claim 1, wherein said photodetectors are disposed on different levels of a multilayer plate.

6. The optical arrangement as defined by claim 1, wherein said photodetectors are disposed on an arched plate.

7. The optical arrangement as defined by claim 6, wherein said plate is flexible.

8. A position measuring device comprising:

an illumination device for generating diffracted partial ray beams comprising a source of light, a first grid and a second grid displaceable relative to each other and positioned to receive said light from said source to generate said diffracted partial ray beams;

one image lens having an optic axis, said one image lens receiving said partial ray beams and transmitting said received partial ray beams, wherein each of said received partial ray beams defines an angle of inclination with respect to a line parallel to said optic axis of said image lens;

a plurality of detectors receiving said diffracted partial ray beams from said image lens during a given moment of time, whereby the one image lens directs a focused ray beam at each of said detectors;

said detectors positioned so that the perpendicular distance between the individual photodetectors and a plane which is perpendicular to said optic axis varies as a function of the angle of inclination of the partial ray beams received by said image lens.

9. The position measuring device as defined by claim 8, wherein the larger the angle of inclination, the smaller the distance between the image lens and a photodetector.

10. The position measuring device as defined by claim 9, wherein said diffracted partial ray beams are brought to interference by said second diffraction grid.

11. The position measuring device as defined by claim 10, wherein light impacting on said first grid is uncollimated.

12. The position measuring device as defined by claim 11, wherein light impacting on said first grid converges.

13. The position measuring device as defined by claim 9, wherein said first grid is part of a scanning plate to receive said transmitted light and to generate first diffracted partial ray beams;

said second grid is part of a scale to receive said first diffracted partial ray beams and to generate second diffracted partial ray beams;

wherein said first grid is positioned to receive said second diffracted partial ray beams and to generate third diffracted partial ray beams which interfere with one another; and wherein those third diffracted partial ray beams having angles of equal inclination are collected by said lens and focused on said photodetectors.

14. The position measuring device as defined by claim 8, wherein said diffracted partial ray beams are brought to interference by said second diffraction grid.

15. The position measuring device as defined by claim 14, wherein light impacting on said first grid is uncollimated.

16. The position measuring device as defined by claim 15, wherein light impacting on said first grid converges.

17. The position measuring device as defined by claim 8, wherein said photodetectors are disposed on raised parts of a plate.

18. The position-measuring device as defined by claim 8, wherein said photodetectors are disposed on different levels of a multilayer plate.

19. The position-measuring device as defined by claim 8, wherein said photodetectors are disposed on an arched plate.

20. The position-measuring device as defined by claim 19, wherein said plate is flexible.

21. The position measuring device as defined by claim 8, wherein said first grid is part of a scanning plate to receive said light from said source and to generate first diffracted partial ray beams;

said second grid is part of a scale to receive said first diffracted partial ray beams and to generate second diffracted partial ray beams;

wherein said first grid is positioned to receive said second diffracted partial ray beams and to generate third diffracted partial ray beams which interfere with one another; and wherein those third diffracted partial ray beams having angles of equal inclination are collected by said lens and focused on said photodetectors.

22. A position measuring device as defined by claim 21, wherein said scale comprises a reference mark, with which at least one of said photodetectors for generating a reference signal is associated.

23. A position measuring device as defined by claim 22, comprising a prism for optical graduation during scanning of the second grid and the reference mark.

24. The position measuring device as defined by claim 22, wherein a plurality of said photodetectors are provided for generating a reference signal and a prism is disposed between said photodetectors and said scanning plate for ray graduation.

25. A method for detecting the intensity modulation of partial ray beams, said method comprising the steps of:

generating said partial ray beams;

directing said partial beams toward one image lens having an optic axis, said one image lens receiving said partial ray beams and transmitting said received partial ray beams, wherein each of said received partial ray beams defines an angle of inclination with respect to a line parallel to said optic axis of said image lens;

providing a plurality of detectors to receive said transmitted partial ray beams from said image lens during a given moment of time; and positioning said detectors so that the perpendicular distance between the individual photodetectors and a plane which is perpendicular to said optic axis varies as a function of the angle of inclination of the partial ray beams received by said image lens.

26. The method as defined by claim 25, wherein the positioning step comprises decreasing the distance between the image lens and a photodetector when the angle of inclination increases.

27. The method as defined by claim 25, comprising the step of producing diffracted partial ray beams which produce a diffraction image on said detectors.

28. A method of measuring position comprising the steps of:

generating partial ray beams;

directing said partial beams toward one image lens having an optic axis, said one image lens receiving said partial ray beams and transmitting said received partial ray beams, wherein each of said received partial ray beams defines an angle of inclination with respect to a line parallel to said optic axis of said image lens;

providing a first grid and a second grid to receive said transmitted partial ray beams to produce diffracted partial ray beams;

displacing said first grid and said second grid relative to each other while said first and second grids receive said transmitted partial ray beams;

providing a plurality of detectors to receive said transmitted partial ray beams from said image lens during a given moment of time; and positioning said detectors so that the perpendicular distance between the individual photodetectors and a plane which is perpendicular to said optic axis varies as a function of the angle of inclination of the partial ray beams received by said image lens.

29. The method as defined by claim 28, comprising the step of bringing said diffracted partial ray beams to interference by said second diffraction grid.

30. The method as defined by claim 28, comprising the step of converging the light impacting on said first grid.

31. The method as defined by claim 28, comprising the step generating a reference signal at one of said detectors.

32. A position measuring device comprising:

an illumination device for generating diffracted partial ray beams comprising a source of light, a first grid and a second grid displaceable relative to each other and positioned to receive said light from said source to generate said diffracted partial ray beams;

one image lens having an optic axis, said one image lens receiving said partial ray beams and transmitting said received partial ray beams, wherein each of said received partial ray beams defines an angle of inclination with respect to said image lens;

a plurality of detectors receiving said diffracted partial ray beams from said image lens, whereby the one image lens directs a focused ray beam at each of said detectors during a given moment of time; and said detectors positioned so that the distance between the individual photodetectors and a plane which is perpendicular to said optic axis is a function of the angle of inclination of the partial ray beams received by said image lens, wherein the larger the angle of inclination, the smaller the distance between the image lens and the photodetector, so that said photodetectors are disposed on different levels of a plate.

33. The position measuring device of claim 32, wherein said diffracted partial ray beams are brought to interference by said second diffraction grid.

34. The position measuring device of claim 32, wherein said photodetectors are disposed on raised parts of said plate.

35. The position measuring device of claim 32, wherein said photodetectors are disposed on different levels of a multilayer plate.

36. The position measuring device of claim 32, wherein said photodetectors are disposed on an arched plate.

37. The position measuring device of claim 32, wherein said plate is flexible.

38. The position measuring device of claim 32, wherein said first grid is part of a scanning plate to receive said light from said source and to generate first diffracted partial ray beams;

said second grid is part of a scale to receive said first diffracted partial ray beams and to generate second diffracted partial ray beams;

wherein said first grid is positioned to receive said second diffracted partial ray beams which interfere with one another;

wherein those second diffracted partial ray beams having angles of different inclinations are collected by said one lens and focused on said photodetectors; and wherein partial ray beams with the same angle of inclination are collected by said one lens and focused on one of said photodetectors.

39. A position measuring instrument with a light source for illuminating a first and a second grating, wherein the first grating is displaceable relative to the second grating; further having a lens between a light source and the first grating, wherein said lens has an optic axis and the light from the light source passes through the lens to the first grating, and from there onto the second grating, said second grating creating a first plurality of diffracted partial ray beams which are reflected to the first grating, said first grating receives said first plurality of diffracted partial ray beams and creating a second plurality of diffracted partial ray beams which strike said lens at various angles of inclination with respect to a line parallel to said optic axis, wherein those second partial ray beams which have the same angle of inclination are focused at one of the plurality of detectors, and the detectors for partial ray beams of differing angles of inclination have a different spacing from the lens, so that the detectors are provided at different levels on one plate.

* * * * *